(12) United States Patent
Briggs et al.

(10) Patent No.: US 7,429,848 B2
(45) Date of Patent: Sep. 30, 2008

(54) BATTERY DISABLE/ENABLE CONTROL CIRCUITRY OF A PORTABLE COMPUTING DEVICE

(75) Inventors: Scott W. Briggs, Cypress, TX (US); Michael W. Edwards, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/314,498

(22) Filed: Dec. 21, 2005

(65) Prior Publication Data

US 2006/0091853 A1 May 4, 2006

Related U.S. Application Data

(62) Division of application No. 10/132,364, filed on Apr. 25, 2002.

(51) Int. Cl.
*H01M 10/46* (2006.01)
(52) U.S. Cl. .................................................. 320/107
(58) Field of Classification Search ................ 320/107, 320/112, 114, 115
See application file for complete search history.

(56) References Cited

U.S. PATENT DOCUMENTS 5,762,512 A * 6/1998 Trant et al. .................. 439/347
6,181,032 B1 * 1/2001 Marshall et al. ............. 307/150

OTHER PUBLICATIONS

*Pocket PC Thoughts*, SoniMobility, http://www.pcketpcthoughts.com/archives/00003535.php, 2 pages (Jan. 9, 2002).

*iPAQ pcket pc Features*, Compaq Computer, http://www.compaq.com/products/handhelds/pcketpc/features.shtml, 1 page, (Jan. 9, 2002).

Jason Dunn, *How to Rest Your Pcket PC Model*, Mobile Devices, http://microsoft.com/mobile/pcketpc/tips/reset.asp, 2 pages, (Jul. 21, 2000).

*D52760 High Precision Li-Ion Battery Monitor*, Dallas Semiconductor, www.dalsemi.com, 25 pages, (Feb. 15, 2001).

Compaq iPAQ PocketPC H3800 Series Reference Guide, pp. 1-116, (Sep. 2001).

Pocket PC: Battery Support Circuitry, pp. 1-6.

Compaq: Aero 1500/2100 Pocket PC Reference Guide, pp. 2, 1-3, 1-4, 1-5, 2-5, 8-6, 2-7, 2-8, 2-9, 2-10, 2-11, 2-12, 2-13 and 2-14, © 2000.

Pocket PC User' s Guide, pp. 1, 2, 52, 60-62 and 65 © 2000.

Compaq IPAQ Pocket PC H3700 series Getting Started Guide, pp. 1-11.

Hp jornada 560 series personal digital assistant Users Guide, pp. 2, 10-16, 47-49, 53-54, 78-80, 132-135, 140 and 155, © (2001).

Pocket PC Central, http://www.pocketpccentral.net/help/ipaq38xxreset.htm, "Resetting the iPAQ 3800 and 3900 Series Pocket PCs", No date available.

* cited by examiner

*Primary Examiner*—Edward Tso

(57) ABSTRACT

A portable computing device includes at least three buttons and circuitry for sensing the pressing of at least three buttons, one being recessed, and in response to such sensing provides a battery disable signal to a non-removable battery. The portable computing device further includes circuitry for sensing the coupling of the device to a device cradle, and in response to such coupling, or in response to the press of the recess button, provides a battery enable signal to the non-removable battery.

5 Claims, 3 Drawing Sheets

BATTERY DISABLE/ENABLE CONTROL CIRCUITRY OF A PORTABLE COMPUTING DEVICE

CROSS-REFERENCE TO RELATED APPLICATIONS

This application is a Divisional of U.S. application Ser. No. 10/132,364, filed Apr. 25, 2002, the disclosure of which is hereby incorporated by reference.

BACKGROUND OF THE INVENTION

1. Field of the Invention

The invention relates to control of enabling and disabling battery connections of a portable computing device.

2. Description of the Related Art

The advantages of portable computing devices continue to be recognized in an ever growing variety of personal and work activities. Being portable, these devices have many design features and constraints not present in their desktop counterparts. For example, such portable computing devices must rely on battery power rather than on the traditional source of power, the electrical outlet. This dependence on a battery source has introduced many new design constraints including: battery charge capacity, battery size requirements, battery under-voltage threats and battery operational impact. Given these constraints, designers have attempted to provide portable computing devices that best satisfy the consumer's needs while balancing the demands inherent in the above identified constraints.

The requirement that portable computing devices be able to function without the tether of a cord plugged into a standard electrical outlet requires that they operate on batteries. A unique feature of portable computing devices, not present in many other battery operated portable electrical devices, is a need for a continuous supply of power even after being turned off. This power demand is due to the operational nature of the volatile memory commonly contained in these devices. Volatile memory requires continuous power to retain the data stored therein. Because it is common for portable computing devices to contain volatile memory, it is important that such devices maintain a constant supply of power.

This need for a continuous supply of power presents many design challenges. For example, because batteries have a limited storage capacity, and because this capacity can be depleted through either operational use, or non-use (i.e., the volatile memory problem), such batteries need to be eventually recharged or replaced. In the case of replacement, when such batteries are replaced there is a period, between the removal of the old battery and insertion of the new battery, where no battery is connected to the device, and as such, there is a period where the volatile memory is without power. To prevent this period of non-power, one solution has been used which incorporates two batteries: a main or primary battery for supplying the normal operating power for the device, and a back-up or secondary battery for use as fail-over power. More specifically, during normal operations, whether turned on or not, the device draws its power from the main battery. It is only when the supply of power from this main battery is interrupted that the back-up battery is drawn upon. This dual battery design allows for the replacement of a main battery of a portable computing device without losing power and thus not losing the data stored in the volatile memory. Although this dual battery approach solves the problem of replacing replaceable batteries, it does not solve the problem discussed below relating to the general large size of replaceable batteries.

Further, there continues to be a demand for batteries that can supply continuous power for the longest amount of time before recharging. Generally, and especially among batteries of similar components, the larger the battery, the longer it can hold a charge. Thus, size not being a factor, very large batteries could be used to provide ever longer periods of charges. However, because it is almost always advantageous to produce portable computing devices that are as small as possible, and because the batteries used in such devices directly impact the ultimate size of such devices, the batteries need to be as small as possible, while providing as much power as possible. Further, user replaceable batteries must be designed with sufficient casing as to protect anyone handling such batteries from its contents. This encapsulation requirement means that such replaceable batteries are inherently larger than their non-replaceable counterparts. Thus, there is a tradeoff between using replaceable batteries with larger size and non-replaceable batteries that are smaller. Because of their smaller size, it is generally preferable to use non-replaceable batteries in portable computing devices.

Another design constraint inherent in using batteries is that batteries generally become damaged when their power is drawn below a particular level of charge (under-voltage). Therefore, to prevent permanent battery damage, it is important to prevent batteries from having their charge drawn down to such levels. It is not uncommon for circuitry to be included with portable computing devices which acts to disconnect or disable its battery when the battery charge level reaches a particular level. This is generally not an action one wishes to allow to occur on such devices since the disabling of the battery will cause the loss of data in the device's volatile memory.

It is also important to deliver the newly purchased portable computing device to the purchaser in the most user friendly condition as possible. Part of this user friendly condition relates to the batteries. For example, in the dual battery design discussed above, the most user friendly condition would be with both batteries installed and the system already powered up when the shipping box is opened. However, such a level of "user friendliness" is impractical and/or too costly as leaving the system fully powered up upon preparation for shipping would result in the batteries being fully discharged before reaching the purchaser. And further, without any type of automatic disabling circuitry, as discussed above, the batteries could suffer permanent damage. An alternative might be to ship the device with both batteries installed, but without leaving the system powered up. This approach would not result in the batteries being discharged as fast as the previous scenario, but would still likely result in the battery being fully discharged before reaching the purchaser. In practice, each of these two scenarios would result in very low user friendly conditions as both would require the purchaser to both diagnose the problem and replace or recharge the batteries before being able to operate the device.

A more user friendly condition would be to ship the device without any batteries installed. This would eliminate the need for the user to both diagnose why the device would not operate and to either recharge or replace the batteries. However, this would still require the purchaser to install the batteries before operating the device. Some manufacturers have devised a more user friendly way to ship their dual battery computing devices where the devices are shipped with the back-up battery already installed and requiring the purchaser to only install the main battery (both replaceable batteries).

This is achieved by installing the back-up battery in the device where an insulator is placed between this battery and its electrical contact and where the purchaser is required to pull the tab connected to the insulator to remove the insulator and to allow for the electrical connection between the back-up battery and the device contacts. Although this removes the need to install two batteries, it still requires two actions by the purchaser before the device is ready for use. The possibility also exists that the tab might separate from the insulator leaving all or part of the insulator between the back-up battery and the electrical contact. Further, as discussed above, this design is less advantageous than other designs using non-replaceable batteries since the device would be required to be larger to accommodate the larger replaceable batteries.

Another approach to the shipment of the portable computing devices has been to ship the devices with the battery(s) installed, where such devices have circuitry including a battery disabled and battery enabled modes, and the device is shipped with the device in the battery disabled mode. For example, such designs as the Compaq iPAQ 3700 series have included the use of a single non-replaceable battery with such disabled and enabled modes. As shown in FIG. 3, such a unit 500 is shipped in the disabled mode and the purchaser activates the unit, i.e., the user changes the unit from the battery disabled mode to the battery enabled mode, by locating a sliding door 522 on the bottom side 530 of the unit 500, and using the accompanying stylus (not shown), sliding the door 522 open, and flipping a slide switch 520 to the on position. Note that reset button 514 is not used in this battery enable procedure. This approach has its drawbacks as users might be confused as to how to power up the system. The users might have a problem identifying the door, or that the switch was behind that door. Another potential negative aspect of this approach is that the door may potentially develop a rattle over time.

Regardless of which of the above approaches involving shipping the batteries in a disabled state is used to ship the portable computing device, each has the common feature of an activation scenario that cannot easily occur accidentally during shipping. As explained above, one needs the batteries to be installed, while another needs a plastic tab removed, and finally another needs a switch behind a door to be thrown.

Designers have also chosen to include a disable battery function in their portable computing devices. Designers have provided different ways, either passive or active, for users to place the units in a disabled state. The passive designs, where a physical break between the battery and the device is required, include those devices where removable batteries are used and the only way to accomplish a disabled state is to remove the batteries. For example, the Compaq Aero 1550 Pocket PC required the removal of both a main battery and a back-up battery. Active designs, where some form of button pressing or switching throwing is needed, include devices such as the Compaq iPAQ 3700 series which simply required the opening of the door at the bottom of the unit and throwing the switch to the disabled position. Another unit was the Hewlett Packard Jornada that required that the unit be turned off using the power button, followed by the simultaneous pressing of the reset button and the power button. The Casio E-115 required the simultaneous pressing of the power button and reset button for two seconds which invokes a screen prompt, followed by the pressing of a control button.

SUMMARY OF THE INVENTION

A portable computing device includes at least three buttons and circuitry for sensing the pressing of at least three buttons, one being recessed, and in response to such sensing provides a battery disable signal to a non-removable battery. The portable computing device further includes circuitry for sensing the coupling of the device to a device cradle, and in response to such coupling, or in response to the press of the recess button, provides a battery enable signal to the non-removable battery.

BRIEF DESCRIPTION OF THE DRAWINGS

A better understanding of the present invention can be obtained when the following detailed description of the disclosed embodiment is considered in conjunction with the following drawings, in which.

DETAILED DESCRIPTION OF PREFERRED EMBODIMENT

Figure 1:
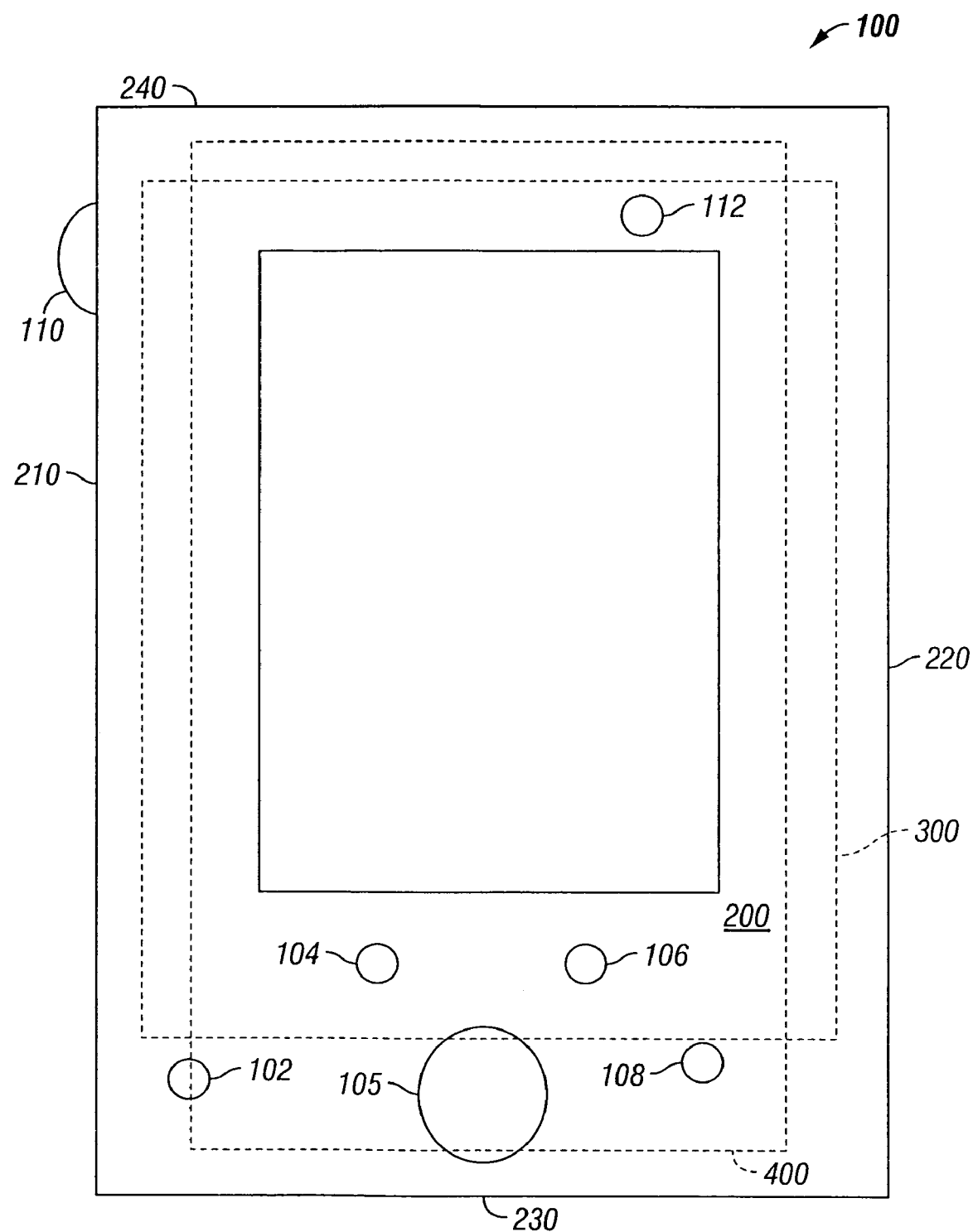
FIG. 1 is a component diagram showing the face of a portable computing device including multiple buttons and a display, and in phantom, the battery and circuitry located there behind.
Figure 2:
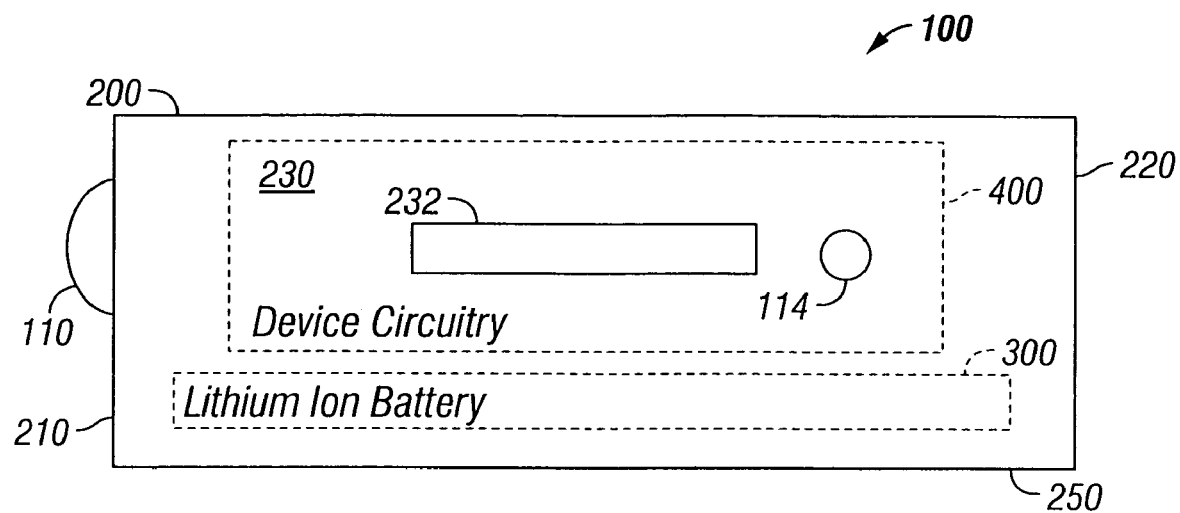
FIG. 2 is a component diagram showing the bottom of the portable computing device of FIG. 1 including a port and a rest button, and in phantom, the battery and circuitry located there behind.
Figure 3:
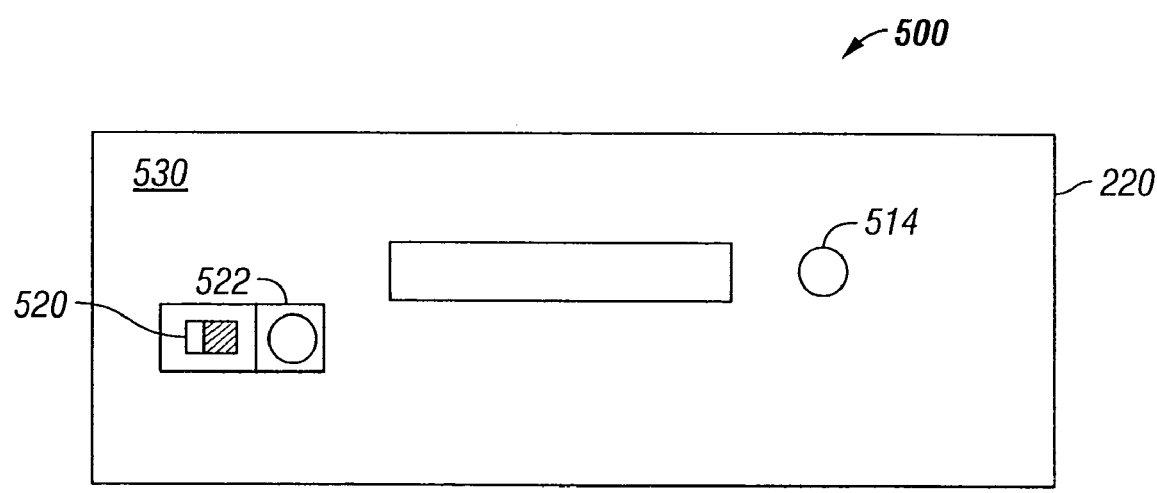
FIG. 3 is a component diagram showing the bottom of a prior art portable computing device including a dedicated switch for controlling the enabling and disabling of the battery.

FIGS. 1 and 2 illustrate an example of a portable computing device 100 implemented according to the disclosed techniques. The term "portable computing device" generally refers to a portable device with a subset or superset of typical computing functions of a personal computer. For purposes of explanation, specific embodiments are set forth to provide a thorough understanding of the present invention. However, it will be understood by one skilled in the art, from reading the disclosure, that the invention may be practiced without these details. Moreover, well-known elements, devices, process steps, and the like, and including, but not limited to, electronic circuitry components and connections, are not set forth in detail in order to avoid obscuring the disclosed system.

FIG. 1 illustrates an example of a portable computing device 100 with a front surface or face 200, left side surface 210, right side surface 220, bottom surface 230 and a top surface 240. FIG. 1 also shows the front surface 200 of the device containing a display screen 290 for text and graphics, application programming buttons 102, 104, 106 and 108, and navigation button 105. Specifically, button 102, near the left side 210 of the device 100, is the calendar button. In addition, button 102 is used in conjunction with buttons 108 and 114 (FIG. 2) in performing a battery disable function. Buttons 108 and 102 re non-adjacent. Button 104, slightly further from the left side 210 of the device 100 than button 102, and adjacent to button 102, is the contacts button. Button 108, near the right side 220 of device 100, is the task button. As mentioned above, button 108 is also used in a battery disable function. Button 106, slightly further from the right side 220 of the device 100, is the inbox button. Button 105, located centrally between the left and right sides, 210 and 220, respectfully, is used as the navigation and scroll through list button. Button 112 is the power button. On the portable computing device's left side 210, and as shown in FIG. 2, is button 110 which is the record/application button. On the portable computing device's bottom 230, a reset button 114 and a charging and communications port 232 is provided. The device bottom 230 is provided without a battery enable/disable switch or accompanying door. As described above, button 114 is also used in the battery disable function. It is contemplated that more or less buttons could be incorporated into the device 100 and that the functionality of particular buttons, or button combinations, could vary without departing from the spirit or scope of the invention. Further, the buttons depicted in the figures may be sensitive to pressure, light, magnetism or other like properties. Also, the buttons may be virtual buttons like those seen in touch screen type devices where either a contact sensitive membrane covering the screen is used, or where a coordinate mapping is used, such as where sensors along the sides of the screen sense the location of an object in contact, or in approximate contact, with the screen.

As shown in FIGS. 1 and 2, the portable computing device 100 includes a lithium ion flat cell battery 300, and circuitry 400 to either enable or disable the battery connection to the device 100 depending on whether an enable or disable signal is generated within the device 100. The flat cell battery 300 is neither removable, nor does it having casing typically found with otherwise replaceable batteries. For a battery protection circuit to disable the battery connection to the portable computing device 100, the circuit must receive a battery disable signal with a predetermined duration such as two or more seconds. The battery protection circuit includes a timer defining the particular duration. Concerning the battery enable signal, it is contemplated that the detection of the coupling between the device 100 and a device cradle or dock could be performed by a number of mechanisms used to sense such a coupling including, but not limited to, electrical, mechanical, optical or magnetic detection mechanisms. It is also contemplated that the coupling necessary to activate the battery connection to the device 100 via a battery enable signal could be a number of devices other than a device cradle or dock, such as a communications device, an A/C power source, or simply a dedicator/activator device used solely to perform such activations.

Figure 4:
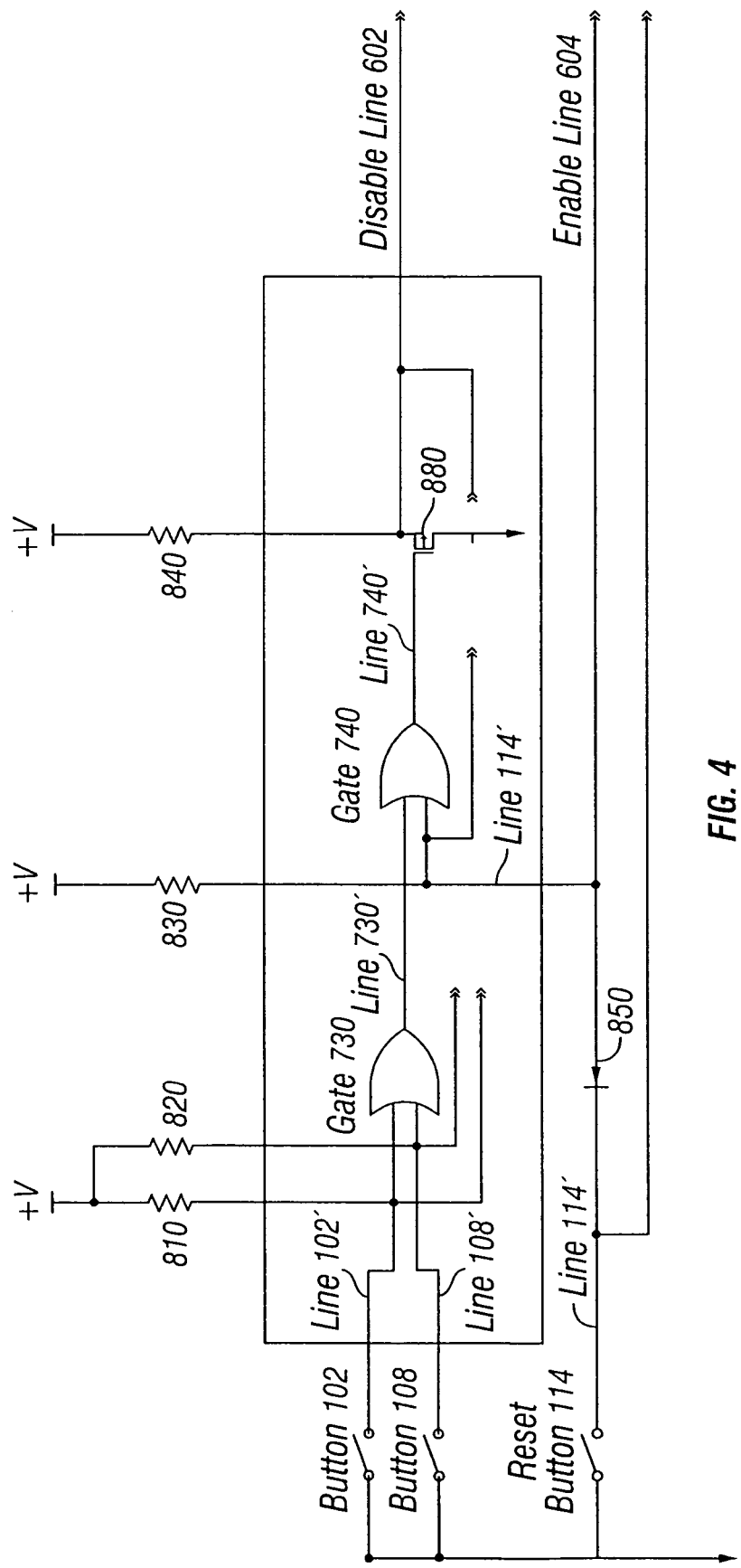
FIG. 4 is a circuit diagram showing exemplary battery disable/enable control circuitry of the portable computing device of FIG. 1 that interprets button activity into battery enable and disable requests.

As shown in FIG. 4, computing device 100 contains battery enable/disable control circuitry 400. This circuitry 400, for example, senses the simultaneous pressing of buttons 102, 108 and 114 and in response provides a battery disable signal. The circuitry 400 may be part of an Application Specific Integrated Circuit (ASIC) of an input/output controller of the device 100. In operation, when all three buttons 102, 108 and 114 are pressed at the same time, the disable line 602 goes low to indicate a disable battery request provided to a battery protection circuit or battery controller such as contained in the Dallas Semiconductor DS2760 battery monitor. Specifically, when each of the buttons 102 and 108 are pressed and these button communications are sensed, the corresponding lines 102' and 108' go low, and when, and only when such two lines go low, line 730' also goes low. Further, if button 114 is pressed, corresponding line 114' goes low. When, line 730' is low, i.e., with buttons 102 and 104 being pressed, and line 114' is low, i.e., with button 114 being pressed, line 740' also goes low. When line 740' goes low, so does disable line 602. A low state of the disable line 602 indicates a battery disable request. To perform this disable battery sequence one may, with one hand, hold a stylus 114, or some instrument capable of reaching recessed button 114, and with it, press the recessed button 114, and with two fingers on the other hand, press buttons 102 and 108. This sort of two-handed operation ensures that a battery is being disconnected intentionally.

Generally, to perform this procedure one may prefer to first place the device 100 on a flat surface rather than grasping in one hand.

As shown in FIG. 4, OR gates 730 and 740 are part of the device circuitry 400. Gate 730 is used to determine if both buttons 102 and 108 are being pressed. Gate 740 is used to determine if both the reset button 114 is being pressed and the output of gate 730 indicates that the two buttons 102 and 108 are also being pressed. If this gate arrangement determines that all such buttons 102, 108 and 114 are being pressed, then disable line 602 is set to low. Further, other combinations of gates, other than what is shown in FIG. 4, may be used to achieve the desired result. Resistors 810-840 serve as pull-up resistors in the circuitry of FIG. 4. When line 740' is low, resistor 840 places transistor 880 into an open collector state, allowing the disable line 602 to go low. Further, when reset button 114 is pressed the enable line 604 goes low and it is when the enable line goes low that signals the enables the battery. The battery has a weak pull up on enable line 604. Diode 890 serves as a protection diode that guards back feeding on the enable line 604. Further, diode 850 prevents current flow from enable line 604 to line 114 when the battery is disable. If diode 850 was not there, and current was allowed to pass from enable line 604 to line 114, the battery would enable prematurely. It should be understood that other circuit configurations may be utilized in accordance with the disclosed techniques. It should also be understood that the circuitry of FIG. 4 can be adapted to support both a primary battery and a secondary battery.

It is contemplated that there are a variety of reasons for ensuring that disabling a battery 300 is intentional. For example, one may want to transfer the device 100 to a new user and may want a quick and easy way of clearing the volatile memory. Another example might be where the device 100 was to be put in storage for an extended period of time without jeopardizing the battery 300 by causing an under-voltage condition. Yet another example, might be where the device 100 is not sufficiently responding to a soft reset and disconnecting the battery 300 is the only option to adequately reset the system 100. Because of the relative catastrophic results of a hard reset, namely the loss of all data stored in volatile memory, it is important that the hard reset procedures be such that they are not accidentally performed. Further, unlike previous portable computing devices, the illustrative system 100 provides a user friendly design, i.e., no batteries to install, no doors to open, no added switches or buttons, with a button sequence that all but ensures that the disable battery procedure is not inadvertently performed. This is done by simultaneous pressing of three buttons with at least one of them recessed.

Also as shown in FIG. 4, when the reset button 114 is pressed, line 114' goes low, as well as enable line 604. When enable line 604 goes low, this is a signal to a battery protection circuit, such as the DS2760 mentioned above, to enable the battery connection. Further, device bottom 230 also contains a charging and communications port 232. Although not shown, computing device 100 contains circuitry to sense the coupling between itself and a device cradle. The coupling sensing occurs through recharge and communications port 232. However, the coupling may occur through other mechanisms, including, but not limited to, electrical, mechanical, optical or magnetic detection mechanisms. When the device 100 is coupled to a device cradle through port 232 the enable line 604 goes low to indicate a battery enable request. The recessed button 114 is pressed when the device 100 resides in the device cradle.

Because portable computing devices are shipped with their batteries in the disabled state, it is important to provide users with a fast and easy method to enable the batteries. The disclosed enabling techniques make it easier for users to enable the battery. Since the battery is enabled automatically upon placement of the device into the device cradle, such techniques allow a user to enable the battery without having to read the instructions on how to operate the portable computing device. Further, since users no longer need to understand how to enable the battery, service calls regarding battery enablement issues should be reduced.

The foregoing disclosure and description of the various embodiments are illustrative and explanatory thereof, and various changes in the button layout, button functionality, button sequence, signals, components, devices, circuit elements, circuit configurations, and signal connections, as well as in the details of the illustrated circuitry and construction and method of operation may be made without departing from the spirit and scope of the invention.

We claim:

1. A portable computing device, comprised of: a button; and
battery enable control circuitry that enables a battery via a battery enable signal in response to the sensing of a communication from the button when the device is connected to a device cradle.

2. The portable computing device of claim 1, wherein the button is a recessed button.

3. The portable computing device of claim 1, wherein the button is a reset button.

4. A method of enable generation for a battery of a portable computing device, the device comprising a recessed button, comprising the steps of:

sensing a communication from the recessed button; and
generating a battery enable signal in response to the sensing step, wherein the battery enable signal enables the battery.

5. The method of claim 4, wherein the recessed button is a reset button.

\* \* \* \* \*